United States Patent

Chen et al.

[11] Patent Number: 6,110,862
[45] Date of Patent: Aug. 29, 2000

[54] CATALYTIC MATERIAL HAVING IMPROVED CONVERSION PERFORMANCE

[75] Inventors: Shau-Lin F. Chen, Piscataway; Harold N. Rabinowitz, Upper Montclair; Chong Kim, Old Bridge, all of N.J.

[73] Assignee: Engelhard Corporation, Iselin, N.J.

[21] Appl. No.: 09/074,239

[22] Filed: May 7, 1998

[51] Int. Cl.$^7$ .................................................... B01J 23/40
[52] U.S. Cl. ...................... 502/326; 502/333; 502/334; 502/339; 423/628
[58] Field of Search ..................... 502/326, 333, 502/334, 339; 423/628

[56] References Cited

U.S. PATENT DOCUMENTS

| | | | |
|---|---|---|---|
| 3,096,154 | 7/1963 | Stewart | 23/143 |
| 3,245,919 | 4/1966 | Gring et al. | 252/465 |
| 3,524,721 | 8/1970 | Stephens | 23/2 |
| 3,545,917 | 12/1970 | Stephens | 23/2 |
| 3,552,913 | 1/1971 | Stephens | 23/2 |

(List continued on next page.)

FOREIGN PATENT DOCUMENTS

| | | | |
|---|---|---|---|
| 615721 | 8/1989 | Australia . | |
| 0 537 862 A1 | 4/1993 | European Pat. Off. | B01J 23/40 |
| 0 556 554 A2 | 8/1993 | European Pat. Off. . | |
| 0 781 591 A2 | 7/1997 | European Pat. Off. | B01D 53/94 |
| 2 291 791 | 6/1976 | France | B01J 23/44 |
| 2 563 120 A1 | 10/1985 | France | B01J 27/13 |
| 50-145381 | 11/1975 | Japan . | |
| 57-105240 | 6/1982 | Japan . | |
| 59-052530 | 3/1984 | Japan . | |
| 59-127649 | 7/1984 | Japan . | |
| 60-019036 | 5/1985 | Japan . | |
| 60-31828 | 7/1985 | Japan . | |
| 60-232253 | 11/1985 | Japan . | |
| 71538 | 4/1987 | Japan . | |
| 63-007895 | 1/1988 | Japan . | |
| 63-077544 | 4/1988 | Japan . | |
| 63-205141 | 8/1988 | Japan . | |
| 63-240947 | 10/1988 | Japan . | |
| WO 95/00235 | 1/1995 | WIPO . | |
| WO 95/35152 | 12/1995 | WIPO . | |
| WO 97/43035 | 11/1997 | WIPO . | |
| WO 98/09726 | 3/1998 | WIPO . | |

*Primary Examiner*—Tom Dunn
*Assistant Examiner*—Cam N. Nguyen
*Attorney, Agent, or Firm*—Richard A. Negin

[57] ABSTRACT

A novel catalytic material is prepared by dispersing a catalytically active species, e.g., one or more platinum group metals, on a support phase that contains a high porosity, meso-pores high surface area (HPMPHSA) material. The HPMPHSA material has a porosity, measured in milliliters per gram of material, that is typically at least about 30 percent greater than that of a corresponding conventional material, preferably at least 50 percent greater. In a particular embodiment, the support phase of the catalytic material contains a HPMPHSA alumina having a porosity of about 0.9 ml/g, whereas a conventional alumina typically has a porosity of about 0.45 ml/g. The surface area is above 90, preferably above 100, more preferably equal or above 150 to 160 m$^2$/g. The support phase may be wholly composed of the HPMPHSA material or it may be composed of a mixture of the HPMPHSA material and a conventional material. Such a mixture preferably contains at least about 20 percent HPMPHSA material, by weight, e.g., 20 to 50 percent by weight.

15 Claims, 1 Drawing Sheet

U.S. PATENT DOCUMENTS

| | | | |
|---|---|---|---|
| 3,565,830 | 2/1971 | Keith et al. | 252/466 |
| 3,669,904 | 6/1972 | Cornelius et al. | 252/465 |
| 3,676,370 | 7/1972 | Stephens | 252/455 |
| 3,770,617 | 11/1973 | Riley et al. | 208/216 |
| 3,773,691 | 11/1973 | Leach | 252/463 |
| 3,787,560 | 1/1974 | Stephens | 423/239 |
| 3,898,322 | 8/1975 | Leach | 423/628 |
| 3,899,444 | 8/1975 | Stephens | 252/455 |
| 3,956,188 | 5/1976 | Hindin et al. | 252/465 |
| 3,974,097 | 8/1976 | Weisang et al. | 252/440 |
| 3,975,509 | 8/1976 | Royer et al. | 423/626 |
| 3,987,155 | 10/1976 | Ziegenhain | 423/628 |
| 3,993,572 | 11/1976 | Hindin et al. | 252/462 |
| 4,014,821 | 3/1977 | Hammer | 252/470 |
| 4,021,185 | 5/1977 | Hindin et al. | 431/7 |
| 4,024,231 | 5/1977 | Ziegenhain | 423/628 |
| 4,038,175 | 7/1977 | Bhasin | 208/144 |
| 4,134,860 | 1/1979 | Hindin et al. | 252/466 |
| 4,157,316 | 6/1979 | Thompson et al. | 252/462 |
| 4,171,287 | 10/1979 | Keith | 252/462 |
| 4,171,288 | 10/1979 | Keith et al. | 252/462 |
| 4,171,289 | 10/1979 | Wheelock | 252/466 PT |
| 4,172,809 | 10/1979 | Triki | 252/455 R |
| 4,175,118 | 11/1979 | Wassermann et al. | 423/628 |
| 4,176,171 | 11/1979 | Bendig et al. | 423/628 |
| 4,179,411 | 12/1979 | Broersma et al. | 252/465 |
| 4,181,602 | 1/1980 | Quick et al. | 208/216 PP |
| 4,189,404 | 2/1980 | Keith et al. | 252/462 |
| 4,279,779 | 7/1981 | Sanchez et al. | 252/448 |
| 4,294,726 | 10/1981 | Bozon et al. | 252/462 |
| 4,335,023 | 6/1982 | Dettling et al. | 252/466 PT |
| 4,418,237 | 11/1983 | Imai | 585/443 |
| 4,438,219 | 3/1984 | Brandenburg et al. | 502/333 |
| 4,454,026 | 6/1984 | Hensley, Jr. et al. | 208/251 H |
| 4,476,246 | 10/1984 | Kim et al. | 502/304 |
| 4,499,203 | 2/1985 | Toulhoat et al. | 502/247 |
| 4,504,598 | 3/1985 | Ono et al. | 502/303 |
| 4,510,262 | 4/1985 | Kim et al. | 502/304 |
| 4,587,231 | 5/1986 | Sawamura et al. | 502/304 |
| 4,591,578 | 5/1986 | Foley et al. | 502/185 |
| 4,591,580 | 5/1986 | Kim et al. | 502/303 |
| 4,624,938 | 11/1986 | Kemp | 502/208 |
| 4,624,940 | 11/1986 | Wan et al. | 502/251 |
| 4,708,946 | 11/1987 | Ohata et al. | 502/304 |
| 4,714,692 | 12/1987 | Abrevaya et al. | 502/261 |
| 4,714,694 | 12/1987 | Wan et al. | 502/304 |
| 4,727,052 | 2/1988 | Wan et al. | 502/327 |
| 4,757,045 | 7/1988 | Turner et al. | 502/252 |
| 4,780,447 | 10/1988 | Kim et al. | 502/243 |
| 4,806,519 | 2/1989 | Chiba et al. | 502/252 |
| 4,808,564 | 2/1989 | Matsumoto et al. | 502/303 |
| 4,923,842 | 5/1990 | Summers | 502/261 |
| 4,965,243 | 10/1990 | Yamada et al. | 502/304 |
| 5,057,483 | 10/1991 | Wan | 502/304 |
| 5,128,306 | 7/1992 | Dettling et al. | 502/304 |
| 5,130,109 | 7/1992 | Wan | 423/213.2 |
| 5,202,300 | 4/1993 | Funabiki et al. | 502/304 |
| 5,212,142 | 5/1993 | Dettling | 502/304 |
| 5,265,519 | 10/1993 | Wan et al. | 502/252 |
| 5,422,331 | 6/1995 | Galligan et al. | 502/333 |
| 5,593,654 | 1/1997 | Decker, Jr. et al. | 423/625 |
| 5,597,771 | 1/1997 | Hu et al. | 502/304 |

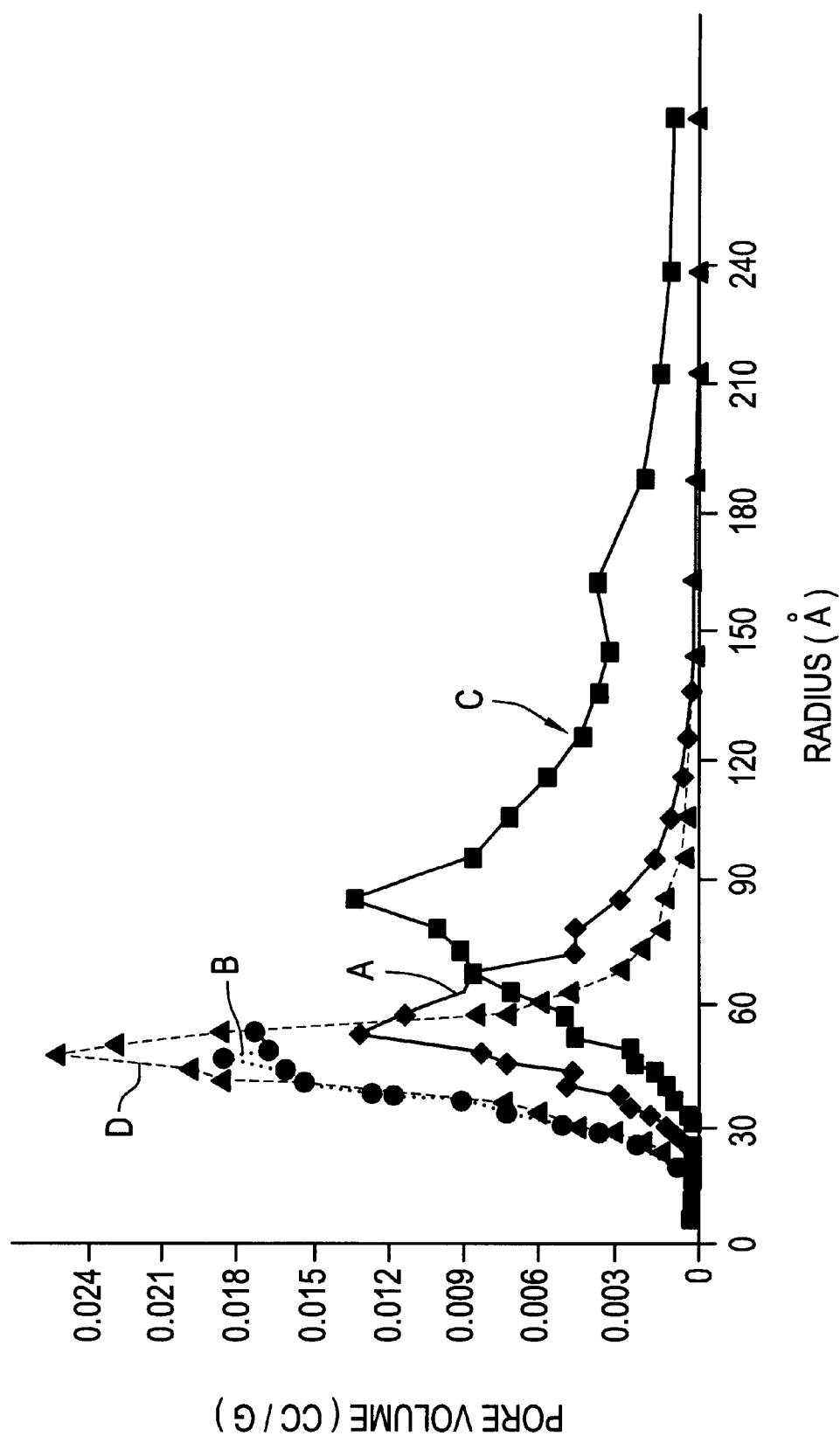

6,110,862

CATALYTIC MATERIAL HAVING IMPROVED CONVERSION PERFORMANCE

BACKGROUND OF THE INVENTION

1. Field of the Invention

The present invention pertains to a catalytic material having improved conversion performance and, in particular, to catalytic materials comprising a support coating comprising a high porosity support material.

2. Related Art

It is well-known in the art to utilize oxidation catalysts, including those commonly referred to as three-way conversion catalysts ("TWC catalysts"), to treat the exhaust gases of internal combustion engines. Oxidation catalysts promote the oxidation of unburned hydrocarbons ("HC") and carbon monoxide ("CO") in engine exhaust to $H_2O$ and $CO_2$. TWC catalysts promote such oxidation reactions and also promote the substantially simultaneous reduction of nitrogen oxides ("$NO_x$") in the exhaust to $N_2$. It is well-known that successful functioning of the TWC catalyst to promote oxidation of HC and CO and to substantially simultaneously reduce $NO_x$ requires that the engine be operated at or close to stoichiometric air/fuel conditions.

It is also well-known in the art to provide such catalysts in the form of a catalytic material comprising a refractory inorganic oxide support material, e.g., activated alumina, on which is dispersed a catalytic metal component such as a platinum group metal component. The catalytic material is normally provided as a thin coating or "washcoat" adhered to a refractory carrier substrate. The latter often takes the form of a body made from a suitable material such as cordierite, mullite or the like, which is formed to have a plurality of parallel, fine gas flow passages extending therethrough. Typically, there may be from about 100 to 600 or more such gas flow passages per square inch of end face area of the substrate.

U.S. Pat. No. 4,757,045 to Turner et al, dated Jul. 12, 1988, discloses a catalytic material comprising a platinum group metal component dispersed on a support coating. The support coating comprises two portions of refractory metal oxide materials. The first material has a surface area greater than about 25 $m^2/g$, an accessible pore volume of greater than about 0.03 cubic centimeters per gram (cc/g), and a pore size range such that at least 95 percent of its pore volume is from pores having diameters of less than 2000 Å. The second material comprises about 1–20 percent of the support coating, has a surface area of less than 25 $m^2/g$, an accessible pore volume of greater than about 0.03 cubic centimeters per gram (cc/g), preferably, 0.1 to 0.3 cc/g, and a pore size range such that at least 35 percent of its pore volume is from pores having a diameter of 2000 Å or greater when measured at a particle size of at least 44 micrometers (microns) diameter. The second material is obtained by the comminution of previously manufactured ceramic-based catalyst members, e.g., ground ceramic honeycomb carriers coated with catalytic material (referred to herein as "scrap catalyst material"), while the first material can be a conventional, stabilized metal oxide powder such as stabilized alumina. While Turner et al characterize the second metal oxide as having a greater pore volume than conventional alumina (see column 4, lines 21–27), the second metal oxide is a low porosity material and the first metal oxide is a medium porosity material relative to the present invention as described below.

In *Heterogeneous Catalysts in Practice*, by Charles Satterfield, published by McGraw-Hill Book Co., it is shown that the pore (Knudsen) diffusion coefficient is proportional to the pore radius of porous solids (page 377) while the diffusion flux (mol/($cm^2$ of pore area·S)) of hydrogen gas and nitrogen gas increases by about two orders of magnitude as pore radius increases from about 1 nanometer (nm) (10 Ångstrom units) to about –100 nn (1000 Å). This indicated the benefits of appropriate pore size distribution inside porous solid for heterogeneous catalysis. Therefore, other gases such as $NO_x$, CO, and some hydrocarbon molecules are expected to behave similarly although the "mass flux and pore-radius relationship" curves may shift up or down as molecular weight and structure vary.

SUMMARY OF THE INVENTION

The present invention relates to a catalytic material comprising a platinum group metal component dispersed on a refractory inorganic oxide support phase, the support phase comprising a high porosity support material having a pore volume greater than 0.5 milliliter per gram (ml/g).

According to one aspect of the invention, the high porosity support material may have a pore volume of at least about 0.65 ml/g or, in a particular embodiment, a pore volume of at least about 0.9 ml/g.

According to another aspect of the present invention, the high porosity support material may comprise a high porosity alumina.

A catalytic material in accordance with the present invention may comprise a platinum group metal component dispersed on a refractory inorganic oxide support phase, the support phase comprising a high porosity first support material having an average pore radius in the range of about 90–180 Ångstroms. For example, the first support material may have an average pore radius in the range of 120 to 135 Ångstroms.

According to another aspect of this invention, the first support material may have a peak pore volume radius of at least 60 Ångstroms. For example, the peak pore volume radius may be in the range of 60 to 90 Ångstroms. Optionally, at least 80 percent of the pore volume of the first support material is provided by pores that have a diameter greater than 60 Ångstroms.

According to still another embodiment of this invention, a catalytic material may comprise a platinum group metal component dispersed on a refractory inorganic oxide support phase, the support phase comprising a first support material having a pore size distribution such that at least 20 percent of the pore volume may be provided by pores that have a radius greater than 90 Ångstroms. Optionally, at least 40 percent of the pore volume may be provided by pores that may have a radius greater than 90 Ångstroms.

According to still another embodiment of this invention, a catalytic material may comprise a platinum group metal component dispersed on a refractory inorganic oxide support phase, the support phase comprising a first support material having a pore size distribution such that at least 10 percent of the pore volume may be provided by pores that have a radius greater than 120 Ångstroms. For example, at least 20 percent of the pore volume may be provided by pores that may have a radius greater than 120 Ångstroms. Optionally, at least 23 or, alternatively, at least 25 percent of the pore volume may be provided by pores that may have a radius greater than 120 Ångstroms.

In any catalytic material described herein, the high porosity support material may comprise a high porosity alumina. The support phase may optionally further comprise non-high porosity support material, i.e., one having a pore volume of less than 0.5 ml/g. In such case, the high porosity support material may comprise at least about 10 percent of the combined weights of the high porosity support material and the non-high porosity support material. For example, the high porosity support material may comprise at least about 33 percent of the support phase, by weight. Alternatively, the high porosity support material may comprise from about 25 to 50 percent of the support phase, by weight. Optionally, the high porosity support material may comprise alumina.

According to one aspect of the invention, the platinum group metal component may comprise palladium dispersed on the high porosity support material and at least one of platinum and rhodium dispersed on the non-high porosity support material. For example, the platinum group metal component may comprise platinum and rhodium dispersed on the non-high porosity support material.

The invention also relates to a method for converting at least one of hydrocarbons, carbon monoxide and $NO_x$ in a gas stream to innocuous substances, comprising flowing the gas stream in contact with any of the catalytic materials described above.

As used herein and in the claims, the term "peak pore volume radius" characterizes the pore size distribution of a material by identifying the radius size of the pores that contribute more to the pore volume of the material than any other size of pores. On a plot of pore volume versus pore radius within a given material, the pore radius at which pore volume is greatest is the peak pore volume radius.

BRIEF DESCRIPTION OF THE DRAWING

The sole FIGURE is a graph showing the pore volume/ pore size distribution for a high porosity alumina (plot C) and three conventional, medium porosity alumina support materials (plots A, B, D).

DETAILED DESCRIPTION OF THE INVENTION AND PREFERRED EMBODIMENTS THEREOF

The present invention provides an improvement in catalytic materials, particularly those materials for the abatement of exhaust gases from hydrocarbon-fueled engines. Catalytic materials of the present invention generally comprise a platinum group metal component comprising one or more platinum group metals dispersed on a support component or "support phase" comprising a highly porous refractory inorganic oxide (or "high porosity") support material. For purposes of this invention, the "porosity" of a support material refers to its pore volume (usually stated in milliliters or, equivalently, in cubic centimeters, per gram of material) in particulate or pulverulent form. Alternatively, the material of the present invention can be characterized by its pore size distribution.

The invention provides catalytic material of surprisingly improved conversion performance relative to comparative catalytic materials, as shown in the examples herein, particularly with respect to maintaining catalytic performance through aging and with respect to activity at temperatures in the range of from about 200° C. to 700° C., but more typically, from about 280° C. to 400° C. Without wishing to be bound by any particular theory, it is believed that when a catalytic material of the present invention is disposed as a washcoat on a carrier, it creates a channel network structure in the washcoat that fosters molecular hydrocarbon diffusion therethrough. It is believed that this improves catalytic performance by reducing pore diffusional limits for gaseous exhaust components therein.

The porosity of the high porosity support material used in the present invention may exceed the porosity of support materials used in prior art catalytic materials (sometimes referred to herein as "medium porosity" or, in some cases, "low porosity"; collectively as "non-high porosity" materials) by at least about 30% or, preferably, by about 50%. The support materials of the present invention may be described, alternatively, in terms of pore size distribution, as described below.

In preparing a catalytic material according to the present invention, a compound and/or complex of any one or more platinum group metals may be utilized in dispersing the platinum group metal component onto the support phase. As used herein, the term "compound", as in "platinum group metal compound", means any compound, complex, or the like which, upon calcination or use of the catalyst, decomposes or otherwise converts to a catalytically active form. The compounds or complexes of one or more platinum group metals may be dissolved or suspended in any liquid which will wet or impregnate the support phase material, which does not adversely react with other components of the catalytic material and which is capable of being removed from the catalyst by volatilization or decomposition upon heating and/or the application of a vacuum. Generally, both from the point of view of economics and environmental aspects, aqueous solutions of soluble compounds or complexes are preferred. For example, suitable water-soluble platinum group metal compounds are chloroplatinic acid, amine solubilized platinum hydroxide, rhodium chloride, rhodium nitrate, hexamine rhodium chloride, palladium nitrate or palladium chloride, etc. The compound-containing liquid is impregnated into the support phase material, which is then dried and preferably calcined to remove the liquid and bind the platinum group metal into the support phase. In some cases, the completion of removal of the liquid and/or anions (which may be present as, e.g., water of crystallization) may not occur until the catalyst is placed into use and subjected to the high temperature exhaust gas. During the calcination step, or at least during the initial phase of use of the catalyst, such compounds are converted into a catalytically active form of the platinum group metal or a compound thereof. An analogous approach can be taken to incorporate the other components into the catalytic material. The catalytic material thus comprises the one or more platinum group metals dispersed on the support phase. Platinum group metals are well-known in the art for their ability to catalyze the conversion of combustion products of carbon fuel-driven engines, such as carbon monoxide, unburned hydrocarbons and nitrogen oxides ($NO_x$) into innocuous substances such as carbon dioxide, water, nitrogen, etc.

The support phase typically comprises one or more refractory inorganic oxides such as alumina, silica, titania, silica-alumina, alumino-silicates, aluminum-zirconium oxide, cerium-zirconium oxide, aluminum-chromium oxide, etc., or mixtures thereof. Such materials are preferably used in their high surface area forms. For example, gamma-alumina is preferred over alpha-alumina. It is known to stabilize high surface area support materials by impregnating the material with a stabilizer species. For example, gamma-alumina can be stabilized against thermal degradation by impregnating the material with a solution of a cerium compound and/or a barium compound and then calcining the impregnated material to remove the solvent and convert the cerium and/or barium compound to cerium and/or barium oxide. The stabilizing species may be present in an amount of from about, e.g., 5 percent by weight of the support material.

Prior art support materials such as alumina generally have a porosity of not more than about 0.5 milliliters per gram (ml/g), e.g., medium porosity alumina has a porosity of in the range of 0.3 to 0.5 ml/g, e.g., 0.45±0.05 ml/g., while low porosity alumina has a porosity of from about 0.03 to 0.3 ml/g. In contrast, a high porosity support material for use in the present invention has a porosity of greater than 0.5 ml/g, e.g., of at least about 0.65 ml/g, preferably at least about 0.75 ml/g. One high porosity alumina suitable for the present invention has a porosity of about 0.9 (e.g., 0.9±0.05) ml/g, or about 95 percent greater porosity than alumina support material conventionally used in the prior art to prepare catalytic materials. Such high porosity alumina may be characterized by a high surface area, e.g., greater than, or at least about, 60 $m^2/g$, typically greater than 100 $m^2/g$, more typically greater than 150 $m^2/g$, e.g., in the range of 150 to 160 $m^2/g$, or greater than 160 $m^2/g$, and/or by its pore distribution. A high porosity material in accordance with the present invention typically has a pore size distribution such that at least 50% of the pore volume of the material is provided by pores that have a radius of 90 Ångstroms or greater. Optionally, 80 percent of the pore volume may be provided by pores that have a radius greater than 60 Ångstroms. Alternatively, a high porosity material may have a peak pore volume radius of 60 Ångstroms or greater. For example, the peak pore volume radius may be in the range of from 60 to 90 Ångstroms. A high porosity support material for use in the present invention may optionally have an average pore radius in the range of from greater than about 80 to 300 Ångstroms. Accordingly, support materials useful in the present invention include high porosity meso pore, high surface area (HPMPHSA) aluminas (exemplified below), which are commercially available.

In addition to the one or more platinum group metals, and the support phase on which the catalytically active metals are dispersed, the catalytic material may optionally comprise a variety of other additives such as stabilizers, promoters, etc. Such additives generally comprise oxides of base metals, e.g., barium, iron, nickel, one or more rare earth metals, such as lanthanum, etc. Such additives may be incorporated into the catalytic material in bulk form or by impregnation into the support phase material or other components of the catalytic material, as is well-known in the art.

The catalytic material is typically rendered in particulate or pulverulent form with particles in the micron-sized range, e.g., 1 to 100 microns, or 5 to 50 microns, in diameter, so that it can be disposed in a liquid (usually water) to form a slurry that can be coated onto a carrier member. The coating is then dried and calcined to leave a washcoat on the carrier. The viscosity of the slurry is determined, apart from the porosity of the particles, by the solids content of the slurry and the particle size thereof. Generally, the solids content of a slurry of particles of a catalytic material should be generally in the range of 10 to 60 weight percent, preferably in the range of 25 to 45 weight percent. A slurry having a solids content in this range allows for convenient coating onto a carrier and for removal of the carrier liquid without the need for a prolonged drying period. To facilitate processing of the slurry and the formation of a thin, uniform coating on the carrier, the viscosity of the slurry is typically in the range of about 1 to 300 centipoise (cps) and is generally at least 5 cps, e.g., from about 10 to 100 cps.

The slurry comprising the catalytic material can be coated onto any suitable carrier member such as a honeycomb-type carrier of the type having a plurality of fine, parallel passages extending therethrough from an inlet or an outlet face of the carrier, so that the passages are open to fluid flow therethrough. The passages, which are typically essentially straight from their fluid inlet to their fluid outlet, are defined by walls on which the catalytic material is coated as a "washcoat" so that the gases flowing through the passages contact the catalytic material. The flow passages of the carrier member are thin-walled channels which can be of any suitable cross-sectional shape and size such as trapezoidal, rectangular, square, sinusoidal, hexagonal, oval, or circular. Such structures may contain from about 60 to about 900 or more gas inlet openings ("cells") per square inch of cross section ("cpsi"), more typically 200 to 600 cpsi. Such honeycomb-type carrier may be made of any suitable refractory material such as cordierite, cordierite-alpha-alumina, silicon nitride, zirconium mullite, spodumene, alumina-silica magnesia, zirconium silicate, sillimanite, magnesium silicates, zirconium oxide, petallite, alpha-alumina and alumino-silicates. Alternatively, a honeycomb-type carrier may be made of a refractory metal such as a stainless steel or other suitable iron-based, corrosion-resistant alloys. The coated carrier or "catalyst member" is disposed in a canister suited to protect it and to facilitate establishment of a gas flow path therethrough, as is known in the art.

When deposited as a washcoat onto a honeycomb-type carrier, the amounts of the various components of the catalytic material are often presented based on grams per volume basis, e.g., grams per cubic foot ($g/ft^3$) for platinum group metal components and grams per cubic inch ($g/in^3$) for other components and for catalytic material as a whole, as these measures accommodate different gas-flow passage cell sizes in different honeycomb-type carrier substances. Catalyst members suitable for use in the present invention may comprise a platinum group metal component loading of 25.5 to 700 $g/ft^3$ with a weight ratio of platinum-to-palladium-to-rhodium of 1–5:60–700:1–5.

As will be demonstrated below, a catalytic material in accordance with one embodiment of the present invention may comprise a support phase that substantially wholly comprises a high porosity support material as described above, and may thus be substantially free of non-high porosity support material, i.e., the support phase may comprise less than 1 percent non-high porosity support material. In other embodiments, the support phase in a catalytic material according to preferred embodiments of the present invention may optionally comprise a mixture of high porosity support material and non-high porosity support material, i.e., medium and/or low porosity support material. In such case, the high porosity support material preferably constitutes at least 10 percent, more preferably greater than 20 percent, e.g., from about 20 to 50 percent, or from about 25 to 50 percent (dry basis), of the weight of the support phase, i.e., of the combined weights of the high porosity support material and the at least one non-high porosity support material. In alternative embodiments, the high porosity material may constitute at least about 33% or, optionally, at least about 67%, of the weight of the support phase. Preferably, in such embodiments, the platinum group metal component comprises palladium dispersed at least on the high porosity support material and at least one, optionally both, of platinum and rhodium dispersed on the at least one non-high porosity support material. Optionally the platinum and rhodium may be dispersed substantially exclusively on non-high porosity support material while the palladium is segregated from the platinum and palladium by being dispersed substantially exclusively on high porosity support material.

EXAMPLE 1

Three sample catalyst members designated M-A, M-B and M-C to correspond to the catalytic materials designated CM-A, CM-B and CM-C which were disposed thereon and which were prepared by placing charges of alumina into a planetary mixer as support phase materials designated A, B and C, respectively.

The Figure depicts the pore size distribution of the materials (and another conventional medium porosity alumina material designated D) by showing (on the vertical axis) how much of the total pore volume is provided by pores of the sizes indicated on the horizontal axis. It should be noted that materials B and D were obtained from the same supplier as different samples of the same material. The difference in pore size distribution between materials B and D indicated by the FIGURE is believed to be attributable to minor variations in the manufacturing process. The FIGURE shows that not only does alumina support phase material "C" have a greater pore volume (represented by the area under the curve) than the support phase materials, but also that its pore volume is provided by pores of larger size than the others. Pore size was determined from nitrogen gas adsorption BET surface area evaluations.

TABLE IA provides a broad comparison between the pore volumes (i.e., porosity), average pore radius and surface area of the conventional, i.e., medium porosity, aluminas A and B, which both have pore volumes of less than 0.5 ml/g, and the high porosity meso pore, high surface area (HPMPHSA) alumina C in accordance with the present invention. Further differences are tabulated in the following TABLE 1B which shows the contribution to total pore volume by pores in the specified size ranges for materials A, D and C. It is apparent from the FIGURE that material B has a pore size/volume distribution similar to that of material D, as would be expected for materials related to each other as described above.

TABLE IA

| | Approx. Support Phase Pore Volume (ml/g) | Support Phase Average Pore Radius (Å) (approx.) | Support Phase Surface Area (M²/g) |
|---|---|---|---|
| Conventional Alumina(A) | 0.36 | 70–80 | 100 |
| Conventional Alumina(B) | 0.45 | 60–70 | 150 |
| "High Porosity" Alumina(C) | 0.9 | 120–135 | 160 |

TABLE IB

| | Percentage of Total Pore Volume | | |
|---|---|---|---|
| Pore Radius | Material D | Material C | Material A |
| <30 Å | 3.13% | 0.00% | 0.50% |
| 30Å~60 Å | 81.29% | 10.51% | 51.57% |
| 60Å~90 Å | 12.30% | 45.00% | 39.76% |
| 90Å~120 Å | 1.61% | 20.06% | 5.66% |
| 120Å~240 Å | 1.44% | 23.10% | 2.35% |
| >240 Å | 0.23% | 1.34% | 0.15% |

From the FIGURE and from TABLE IB, it is seen that material C differs significantly from the others. For example, the majority of the pore volume of material C was provided by pores having radii in the range of from greater than about 80 to 300 Ångstroms, and about half of the pore volume was provided by pores having a pore radius in the range of 90 to 180 Ångstroms. Further, while the peak volume pore radius of materials A, B and D was in the 30 to 60 Ångstroms radius range, the peak pore volume radius in material C was in the range of 60 to 120 Ångstroms. Material C had a negligible pore volume from pores of radius less than 30 Ångstroms. At least 20 percent, probably at least 40 percent, of the pore volume of material C was provided by pores having a radius larger than 90 Ångstroms. Alternatively, a material in accordance with the present invention, such as material C, can be characterized in that at least 10 percent of the pore volume, optionally at least 20 percent, or at least 23 percent, e.g., at least 25 percent, of the pore volume is provided by pores that have a radius greater than 120 Ångstroms. In contrast, materials A, B and D had insignificant pore volume from pores of radius 120 Ångstroms or greater.

Charges of aluminas A, B and C were impregnated separately in a dropwise manner with a solution containing a soluble palladium salt. Each of the impregnated powders was transferred to a ball mill and mixed into a slurry with a grinding medium. The ball mill was run until the particles therein had a particle size distribution in which 90 percent of the particles had a diameter of less than 20 microns. Each resulting slurry was decanted and its solids content was adjusted for convenient coating onto a carrier and subsequent drying. Honeycomb-type ceramic carriers having undercoats of platinum- and rhodium-bearing alumina were coated with the slurries and an air knife was used to clear the honeycomb channels of excess material. The coated carriers were dried and calcined to produce sample catalyst members designated M-A, M-B and M-C having disposed thereon catalytic materials comprising support materials A, B and C, respectively.

Catalyst members M-A, M-B and M-C each comprised a platinum group metal component comprising platinum, palladium and rhodium in proportions of 2:23.3:1 with a total platinum group metal loading of about 197.5 g/ft³. The catalyst members were aged by disposing them in the exhaust gas line of an engine for 50 hours with a maximum catalyst bed temperature of about 900° C. Then, the conversion activity of each catalyst member was tested for the engine exhaust under the following conditions: 8 CR (chamber reactor) conversion test at 80,000 VHSV, i.e., a flow rate of 6820 liters per hour through a catalyst member having a volume of 5.2 cubic inches, 300° C. gas temperature, stoichiometric conditions with ±0.7 A/F perturbations at 1 Hz. The results of the tests are set forth in the following TABLE IC.

TABLE IC

| | | Conversion (%) | | |
|---|---|---|---|---|
| Sample | Support Phase | HC | CO | $NO_x$ |
| M-A | Conventional | 52 | 38 | 58 |
| M-B | Conventional | 67 | 47 | 65 |
| M-C | "High Porosity" | 76 | 55 | 69 |

The data shown in TABLE IC clearly illustrate that the catalyst member prepared with catalytic material comprising a support phase comprising a high porosity support material provides superior post-aging conversion performance relative to catalytic materials solely comprising conventional, i.e., medium porosity, aluminas.

EXAMPLE 2

Samples of catalytic materials comprising palladium dispersed on alumina and designated CM-E, CM-F, CM-G and CM-H were prepared as generally described above, except for the following differences. The support phase of catalytic material CM-E wholly comprised conventional alumina; the support phase of catalytic material CM-F comprised a mixture of conventional alumina and HPMPHSA alumina wherein the HPMPHSA alumina comprised about 33 percent by weight of the mixture; the support phase of catalytic material CM-G comprised a mixture of conventional alumina and HPMPHSA alumina wherein the HPMPHSA alumina constituted about 67 percent by weight of the mixture. The support phase of catalytic material CM-H wholly comprised HPMPHSA alumina. The platinum group metal component in each case comprised palladium.

Catalytic materials CM-E, CM-F, CM-G and CM-H were coated onto carriers to produce sample catalyst members designated M-E, M-F, M-G and M-H accordingly, each having a palladium loading of about 160 g/ft$^3$. The sample catalyst members were subjected to engine aging as described above. The conversion activity of each sample catalyst member was then tested under the following conditions: 500° C., 8 CR sweep=80 k/hr., ±0.7 A/F at 1 Hz, stoichiometric. The results of the test are set forth in the following TABLE II.

TABLE II

| Catalyst Member | Support Phase Alumina | Conversion (%) | | |
| --- | --- | --- | --- | --- |
| | | HC | CO | NO$_x$ |
| M-E | conventional "medium porosity" | 82 | 56 | 58 |
| M-F | 33% "HPMPHSA" | 87 | 55 | 63 |
| M-G | 67% "HPMPHSA" | 85 | 58 | 62 |
| M-H | 100% "HPMPHSA" | 86 | 60 | 64 |

The data set forth in TABLE II illustrate that catalyst members prepared from catalytic materials comprising a support phase comprising HPMPHSA alumina, e.g., 33% or more of a high porosity support material by weight of the support phase, or 67% or more, or that wholly comprise high porosity alumina, generally exhibit unexpectedly better hydrocarbon and NO$_x$ conversion performance after aging than catalytic materials comprising only conventional alumina.

While the invention has been described in detail with reference to particular embodiments thereof, it will be apparent that upon a reading and understanding of the foregoing, numerous alterations to the described embodiment will occur to those skilled in the art and it is intended to include such alterations within the scope of the appended claims.

What is claimed is:

1. A catalytic material comprising a platinum group metal component dispersed on a refractory inorganic oxide support phase, the support phase comprising a first support material having a pore size distribution in which about 98% of the pore volume of the first support material is provided by pores that have a radius in the range of about 30 to 240 Ångstroms.

2. The catalytic material of claim 1 wherein about 88% of the pore volume of the first support material is provided by pores that have radii in the range of from about 60 to 240 Ångstroms.

3. The catalytic material of claim 1 wherein about 43% of the pore volume of the first support material is provided by pores that have radii in the range of from about 90 to 240 Ångstroms.

4. The catalytic material of claim 1 wherein about 55% of the pore volume of the first support material is provided by pores that have radii in the range of from about 30 to 90 Ångstroms.

5. The catalytic material of claim 1 wherein about 20% of the pore volume of the first support material is provided by pores that have radii in the range of from about 90 to 120 Ångstroms.

6. The catalytic material of any one of claims 1, 2, 3, 4 or 5 wherein the first support material comprises a high porosity, high surface area material having a particle size in the range of from 0.1 to 100 micrometers.

7. The catalytic material of claim 6 wherein the support phase further comprises a non-high-porosity second support material having a pore volume of less than 0.5 ml/g.

8. The catalytic material of claim 7 wherein the high porosity first support material comprises at least about 33 percent of the support phase, by weight.

9. The catalytic material of claim 7 wherein the high porosity first support material comprises from about 25 to 50 percent of the support phase, by weight.

10. The catalytic material of claim 7 wherein the high porosity first support material comprises alumina.

11. The catalytic material of claim 7 wherein the at least one non-high porosity first support material comprises medium porosity alumina.

12. The catalytic material of claim 7 wherein the first support material comprises at least about 10% by weight of the support phase.

13. The catalytic material of claim 7 comprising palladium dispersed on the first support material and at least one of platinum and rhodium dispersed on the second support material.

14. The catalytic material of claim 6 wherein the support material comprises alumina.

15. The catalytic material of any one of claims 1, 2, 3, 4 or 5 wherein the support material comprises alumina.

* * * * *